United States Patent
Gottschalk et al.

(10) Patent No.: US 9,318,892 B2
(45) Date of Patent: Apr. 19, 2016

(54) SURGE ARRESTER

(75) Inventors: Ingo Gottschalk, Berlin (DE); Erhard Pippert, Dallgow-Doeberrtiz OT Seeburg (DE); Dirk Springborn, Berlin (DE); Markus Sulitze, Falkensee (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 140 days.

(21) Appl. No.: 14/130,097

(22) PCT Filed: Jun. 15, 2012

(86) PCT No.: PCT/EP2012/061399
§ 371 (c)(1),
(2), (4) Date: Dec. 30, 2013

(87) PCT Pub. No.: WO2013/000732
PCT Pub. Date: Jan. 3, 2013

(65) Prior Publication Data
US 2014/0133060 A1 May 15, 2014

(30) Foreign Application Priority Data

Jun. 28, 2011 (DE) .......................... 10 2011 078 210

(51) Int. Cl.
*H02H 9/04* (2006.01)
*H01C 7/12* (2006.01)

(52) U.S. Cl.
CPC . *H02H 9/041* (2013.01); *H01C 7/12* (2013.01)

(58) Field of Classification Search
USPC ...................................... 361/118, 39, 40, 117
See application file for complete search history.

(56) References Cited

U.S. PATENT DOCUMENTS

| 3,735,259 | A   | * | 5/1973  | Palmer ........................ 324/110 |
|-----------|-----|---|---------|----------------------------------------|
| 6,777,614 | B1  | * | 8/2004  | Suenwoldt ............... H01C 7/12 174/50 |
| 8,009,402 | B2  |   | 8/2011  | Klaube                                 |
| 2008/0088406 | A1 | * | 4/2008 | Klaube et al. ................... 338/21 |
| 2009/0046408 | A1 | * | 2/2009 | Klaube .................. H01C 7/123 361/118 |
| 2009/0225487 | A1 | * | 9/2009 | Klaube ..................... H01C 7/12 361/118 |
| 2010/0237980 | A1 | * | 9/2010 | Klaube et al. ................... 338/21 |
| 2010/0307793 | A1 | * | 12/2010| Kruska .......................... 174/139 |
| 2011/0216464 | A1 | * | 9/2011 | Barenthin ................ H01C 7/12 361/118 |
| 2012/0250207 | A1 | * | 10/2012| Stenstrom .............. H01C 7/126 361/118 |
| 2013/0222964 | A1 |   | 8/2013 | Pippert et al.                          |

(Continued)

FOREIGN PATENT DOCUMENTS

AU  2002229480 A1  7/2002
DE     10104393 C1  4/2002

(Continued)

*Primary Examiner* — Thienvu Tran
*Assistant Examiner* — Angela Brooks
(74) *Attorney, Agent, or Firm* — Laurence Greenberg; Werner Stemer; Ralph Locher

(57) ABSTRACT

A surge arrester includes at least one resistor element and a cage in which the at least one resistor element is disposed. The cage includes an upper holder, a lower holder and at least three insulating rods, which are each held at one respective rod end thereof by the upper holder and at the other respective rod end thereof by the lower holder. The upper holder and the lower holder are configured in such a way that they each enable at least two different positions for at least one of the insulating rods, relative to the two holders, and the at least one insulating rod can be positioned differently relative to the two holders.

11 Claims, 17 Drawing Sheets

(56) References Cited

U.S. PATENT DOCUMENTS

| | | | |
|---|---|---|---|
| 2014/0133060 A1* | 5/2014 | Gottschalk et al. | 361/118 |
| 2014/0139965 A1* | 5/2014 | Sulitze | 361/118 |
| 2014/0139966 A1* | 5/2014 | Sulitze | 361/118 |
| 2014/0218834 A1* | 8/2014 | Klaube | H01C 7/12 361/118 |

FOREIGN PATENT DOCUMENTS

| | | |
|---|---|---|
| DE | 102009007067 A1 | 8/2010 |
| EP | 1977434 B1 | 7/2009 |
| WO | 0055869 A1 | 9/2000 |
| WO | 2009044462 A1 | 4/2009 |
| WO | 2012062695 A1 | 5/2012 |

* cited by examiner

FIG 15
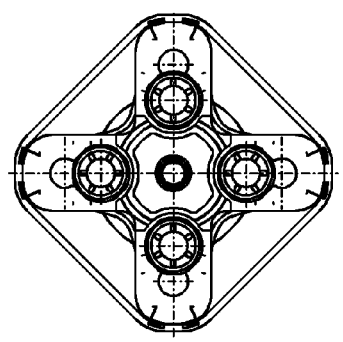
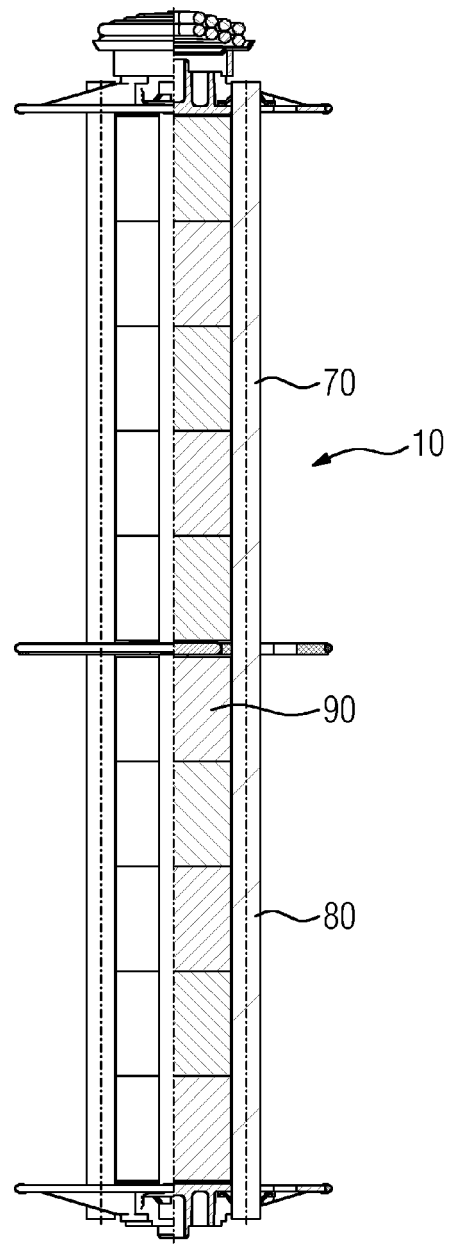

SURGE ARRESTER

BACKGROUND OF THE INVENTION

Field of the Invention

The invention relates to a surge arrester having at least one resistor element and a cage in which the at least one resistor element is disposed. The cage includes an upper holder, a lower holder and at least three insulating rods which are each held at one respective rod end by the upper holder and at the other respective rod end by the lower holder.

Such a surge arrester is known from the European patent EP 1 977 434 B1. This surge arrester has a cage in which multiple resistor elements are arranged, stacked one on top of the other. The cage itself consists of an upper holder, a lower holder, and multiple insulating rods separated from one another which are held with one of their bar ends by a through hole in the upper holder and with their other bar ends by a through hole in the lower holder.

BRIEF SUMMARY OF THE INVENTION

The object of the invention is to provide a surge arrester which can be mounted easily and allows relatively high manufacturing tolerances for the components of the surge arrester.

This object is achieved according to the invention by a surge arrester having at least one resistor element and a cage in which the at least one resistor element is disposed. The cage includes an upper holder, a lower holder and at least three insulating rods which are each held at one respective rod end by the upper holder and at the other respective rod end by the lower holder. The upper holder and the lower holder are configured in such a way that they each allow two different positions for at least one of the insulating rods relative to the two holders and the at least one insulating rod can be positioned differently relative to the two holders. Advantageous embodiments of the surge arrester according to the invention are provided in the sub claims.

It is then provided according to the invention that the upper holder and the lower holder are designed such that they permit in each case at least two different positions for at least one of the insulating rods—relative to the two holders—and the at least one insulating rod can be positioned differently relative to the two holders.

An essential advantage of the surge arrester according to the invention consists in the fact that, because of the design according to the invention of the holders with respect to the external dimensions of the resistor elements which are arranged in the cage, the surge arrester is less sensitive to tolerances than surge arresters from the prior art. This may thus result in the absence of any clamps, in contrast to the surge arresters from the prior art, when the resistor elements are slightly larger than was originally provided because the size of the cage may be increased and mechanical play created by changing the position of the at least one insulating rod.

A further essential advantage of the surge arrester according to the invention is that, by virtue of its flexible cage design, it can be employed for different electrical requirements. If it is intended for the surge arrester to be able to conduct, for example, very high short-circuit currents, then resistor elements with large cross-sections can be used, which is enabled by positioning the at least one insulating rod suitably in the outer region of both holders. If, in contrast, it is intended to make use of resistor elements with small cross-sections, for example for cost reasons, then this requirement can be accommodated by positioning the at least one insulating rod correspondingly more tightly, by arranging the insulating rod in the inner region of the holders, i.e. closer to the center of the cage.

According to a first particularly preferred embodiment of the surge arrester, it is provided that the upper holder and the lower holder for fastening the at least one variably positionable insulating rod each have a slot, through which the rod ends of the thus variably positionable insulating rod are passed. Because of the presence of the slots in the two holders, it is possible to position the insulating rods in any manner inside the contour of the slots and hence to obtain a step less adaptation of the position of the insulating rods relative to the resistor elements.

In order to avoid the insulating rods still having mechanical play relative to the resistor elements after mounting, it is advantageously provided that at least one tightening strap, which can be adjusted during mounting, is present which is passed around the variably positionable insulating rod and exerts a tensile force, in the direction of the at least one resistor element, on the variably positionable insulating rod. Thus, when the cage is mounted, by tightening the adjustable tightening strap it can be achieved in a simple fashion that the insulating rod bears against the resistor elements with no play. It is thus possible to adapt the size of the cage to the respective size of the resistor elements with no play.

With a view to simple mounting of the tightening strap or straps, it is considered to be advantageous if the upper holder and/or the lower holder for fastening the at least one variably positionable insulating rod each have at least one support section, and the adjustable tightening straps are in each case passed around one of the support sections and the variably positionable insulating rod and, by being supported on the support section, exert a tensile force, in the direction of the at least one resistor element, on the variably positionable insulating rod. It is possible for the adjustable tightening strap to be passed around a support section and the insulating rod during mounting with minimal manual intervention, thus allowing simple and cost-effective mounting of the surge arrester.

With a view to effectively aligning the insulating rods relative to the resistor elements, it is considered to be advantageous if the longitudinal direction of the slots extends radially outward from the center of the cage.

The adjustable tightening strap is preferably a cable tie because cable ties can be obtained commercially very cost-effectively.

In order to achieve a stable cage structure, it is considered to be advantageous if at least one preferably non-conductive intermediate holder is present between the upper holder and the lower holder. Such an intermediate holder enables relatively elongated cages, i.e. those which are relatively long in the longitudinal direction of the resistor elements, to be produced with sufficient mechanical stability.

With respect to the design of the at least one intermediate holder, it is considered to be advantageous if the intermediate holder for fastening the at least one variably positionable insulating rod has a slot with a longitudinal direction extending radially outward from the center of the cage and through which the variably positionable insulating rod can be passed, and if an adjustable tightening strap is present which is passed around the variably positionable insulating rod and exerts a tensile force on the latter, in the direction of the center of the cage.

Also with respect to the design of the intermediate holder or holders, it is considered to be advantageous to use support sections; accordingly it is proposed that the intermediate holder for fastening the at least one variably positionable insulating rod has at least one support section, and the adjustable tightening strap is passed around the support section and the variably positionable insulating rod.

It is preferably provided that the intermediate holder is arranged between two resistor elements and a connecting element electrically connecting two resistor elements is inserted in a through hole of the intermediate holder.

The through hole is preferably smaller than the cross-sectional area of the two resistor elements and the support section is preferably arranged between the through hole and the slot. Alternatively, it is considered to be advantageous if the adjustable tightening strap is passed around the through hole and the variably positionable insulating rod.

According to a second particularly preferred design of the surge arrester, it is provided that the upper holder and the lower holder for fastening the at least one variably positionable insulating rod each have a slot through which the rod ends of the variably positionable insulating rod are passed, the slot having at least one tapered part by means of which the slot is divided into adjacent slot sections, the size of each slot section being such that the variably positionable insulating rod can be passed through the respective slot section, and the dimension of the tapered part being such that the variably positionable insulating rod is held in the respective slot section and is prevented from being displaced from the respective slot section to an adjacent slot section. In this design, the tapered parts advantageously ensure that the position of the insulating rods in the upper and lower holder is specified even without a tightening strap. The final intended size of the resulting cage is determined by selecting the relative position of the insulating rods inside the slot when the insulating rods are introduced into the upper and lower holder.

It is considered to be particularly advantageous if the slot has at least two tapered parts and thus at least three adjacent slot sections into which the insulating rod can optionally be introduced.

According to a third particularly advantageous design of the surge arrester, it is provided that the upper holder and the lower holder for fastening the at least one variably positionable insulating rod each have at least two fastening holes, arranged spaced apart from each other, which are each suitable for having a rod end of the variably positionable insulating rod passed through them. In this design of the surge arrester, the intended size of the resulting cage is determined when the insulating rods are mounted by the insulating rods being introduced into the respective suitable fastening hole in the upper and lower holder.

It is furthermore considered to be advantageous if at least the upper holder and the lower holder each have, on their outer contour, a holding means, in particular in the form of a fastening groove which enables a ring (for example, an O-ring), in particular an elastic one, which has a mechanical damping effect to be applied. A ring which has a mechanical damping effect and is applied to the outer contour of the upper and lower holder advantageously allows the surge arrester to be stored flexibly and transported safely, for example from the factory to the location where it is to be ultimately used. Thus, the surge arrester can, for example, be transported horizontally by the upper and lower holders with the ring positioned on them being laid on an at least essentially horizontal transportation surface. Because of the ring's property of having a mechanical damping effect, during transportation vibrations and impacts, for example when there are bumps during transportation, can be mechanically absorbed without there being any possibility of the surge arrester being subjected to high mechanical loads or even being destroyed.

BRIEF DESCRIPTION OF THE SEVERAL VIEWS OF THE DRAWING

The invention is described in detail below with the aid of three exemplary embodiments in which, by way of example:

FIG. 15 shows the surge arrester with the insulating rods positioned in the case of resistor elements of small cross-section.

DESCRIPTION OF THE INVENTION

For the sake of clarity, the same reference symbols are always used in the figures for identical or comparable elements.

Figure 1:
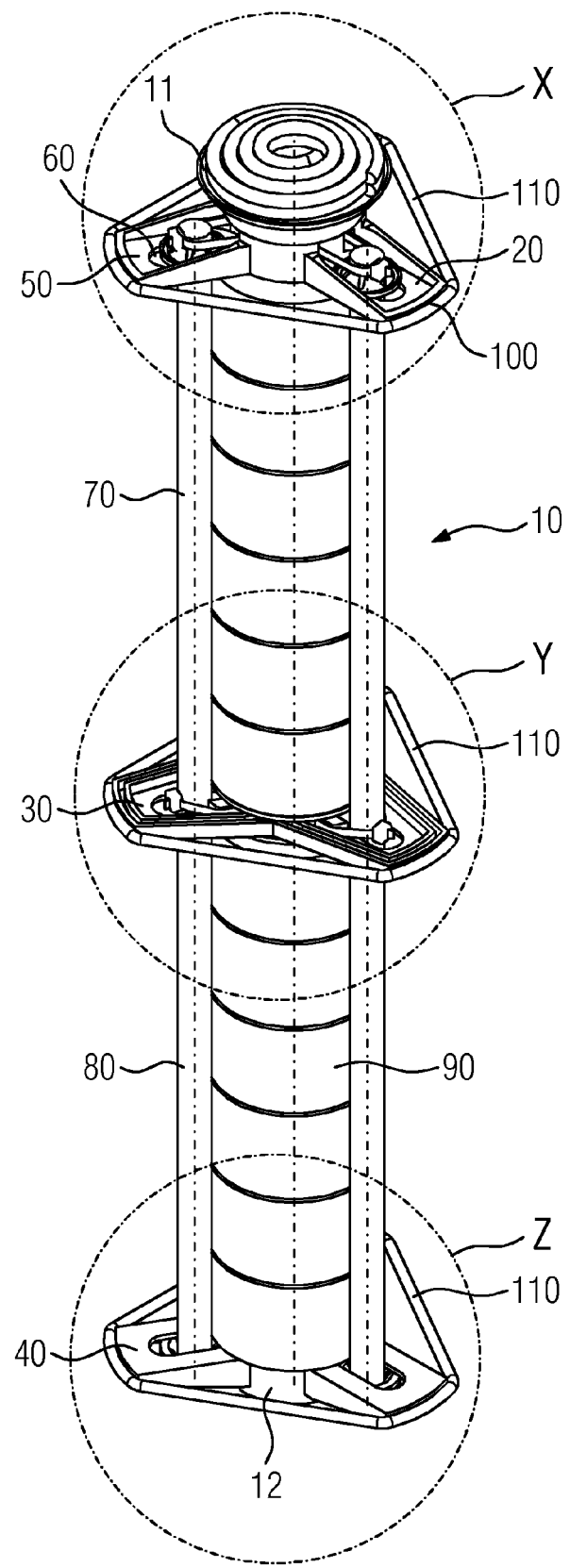
FIG. 1 shows a first exemplary embodiment for a surge arrester according to the invention with three insulating rods which are each held in slots.

A first exemplary embodiment for a surge arrester 10 can be seen in FIG. 1. The surge arrester 10 has an upper holder 20, an intermediate holder 30, and a lower holder 40. The upper holder 20, the intermediate holder 30 and the lower holder 40 each comprise three radially outward extending holding sections 50 which are each equipped with a slot 60. The longitudinal direction of the slots 60 is selected such that the slots each extend radially outward from the center of the cage.

The three holders 20, 30 and 40 each hold three insulating rods 70, only two of which can be seen in FIG. 1. The holders 20, 30 and 40 form with the insulating rods 70 a cage 80 of the surge arrester 10 in which multiple resistor elements 90 are arranged. The resistor elements 90 can, for example, be var.istors. The function of the resistor elements 90 consists in providing a high electrical resistance between the upper end 11 of the surge arrester 10 and the lower end 12 of the surge arrester 10 as long as the electrical voltage present at the outside does not exceed a predetermined threshold value. When the electrical voltage present at the outside exceeds this threshold value, the electrical resistances of the resistor elements 90 changes such that the latter assume a low-resistance state and cause an electrical short-circuit between the two ends 11 and 12. These results in a current flow through the resistor elements 90 so that a surge is arrested by the surge arrester 10 and downstream electrical components that are electrically connected to the surge arrester 10 are protected from the surge.

It can moreover be seen in FIG. 1 that the holding sections 50 of the three holders 20, 30 and 40 are each configured with a holding means in the form of a fastening groove 100 and in each case carry an elastic ring 110, for example in the form of an O-ring. The function of the ring 110 consists in ensuring that the surge arrester 10 is protected during transportation. Thus the surge arrester 10 can be transported not only in a vertical position, as shown in FIG. 1, but also in a horizontal position. The surge arrester 10 thus rests on the three rings 110 and is mechanically protected by virtue of the elastic and damping properties of the three rings 110. This makes it possible, for example, to transport the surge arrester 10 horizontally because mechanical shocks, as can be caused, for example, by bumps during transportation, are damped.

In the exemplary embodiment according to FIG. 1, the three holders 20, 30 and 40 are each provided, as already mentioned, with three radially outward oriented holding sections 50 and thus each carry three insulating rods 70. It is alternatively possible to equip the three holders 20, 30 and 40 with more slots 60 so that more than three insulating rods 70 can be held and the cage 80 can be equipped with more than three insulating rods 70.

Figure 2:
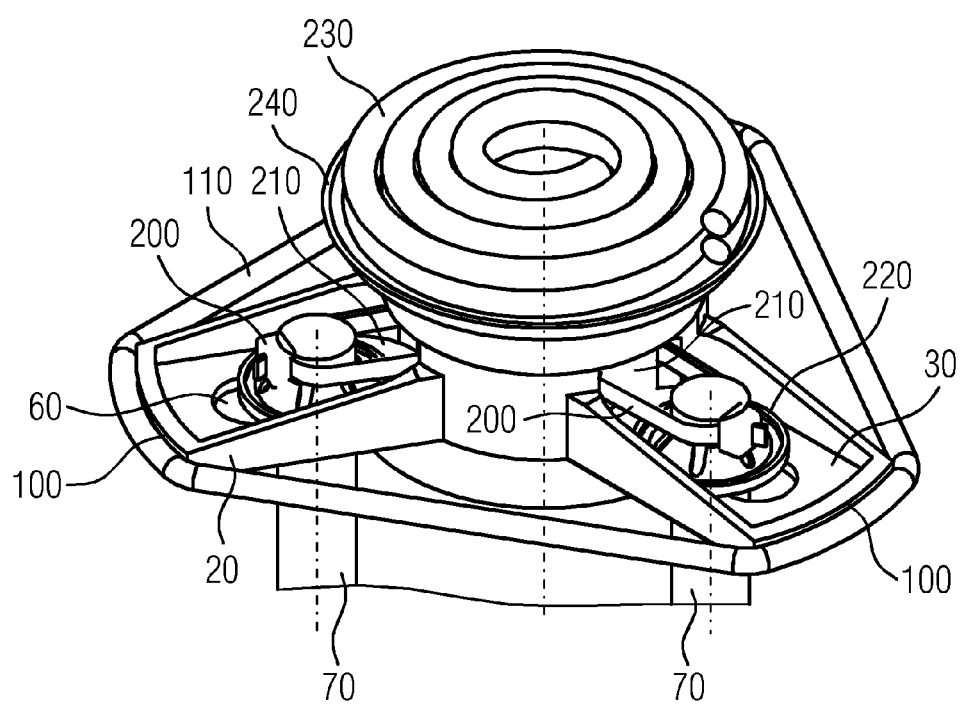
FIG. 2 shows an exemplary embodiment for an upper holder of a cage of the surge arrester according to FIG. 1 in greater detail.

FIG. 2 shows the detail marked by the reference symbol X in FIG. 1 in greater detail. The upper holder 20 with the radially outward extending holding sections 50 and the fastening groove 100 attached to the outside of the holding sections 50, which carry the elastic ring 110 with a mechanical damping effect, can be seen.

Furthermore, the shape of the slots 60, which are directed radially outward, can be better seen. The insulating rods 70 can be displaced inside the contour of the respective slot 60 and thus displaced radially relative to the resistor elements 90. In order to prevent mechanical play between the insulating rods 70 and the resistor elements 90, cable ties 200 are provided which are each passed around an insulating rod 70 and a supporting section 210 of the upper holder 20. When the cable ties 200 are tightened, they exert a tensile force on the respectively associated insulating rod 70 in a radial direction, and to be precise in the direction of the center of the cage, so that the insulating rods 70 are drawn toward the resistor elements 90. In other words, the insulating rods 70 bear firmly against the resistor elements 90 after the cable ties 200 have been tightened.

Clamping elements 220, which prevent the insulating rods 70 from slipping out from the upper holder 20 along the longitudinal axis of the insulating rods, can furthermore be seen in FIG. 2.

In sum, the insulating rods 70 are held on the upper holder 20, i.e. along the longitudinal direction of the insulating rods 70, by the clamping elements 220, whereas the positioning inside the slots 60 is effected by the cable ties 200 which draw the respective insulating rod toward the resistor element 90.

It can moreover be seen in FIG. 2 that the upper end of the upper holder 20 can be equipped with a conical spring 230 and a spring cup 240 holding the conical spring.

Figure 7:
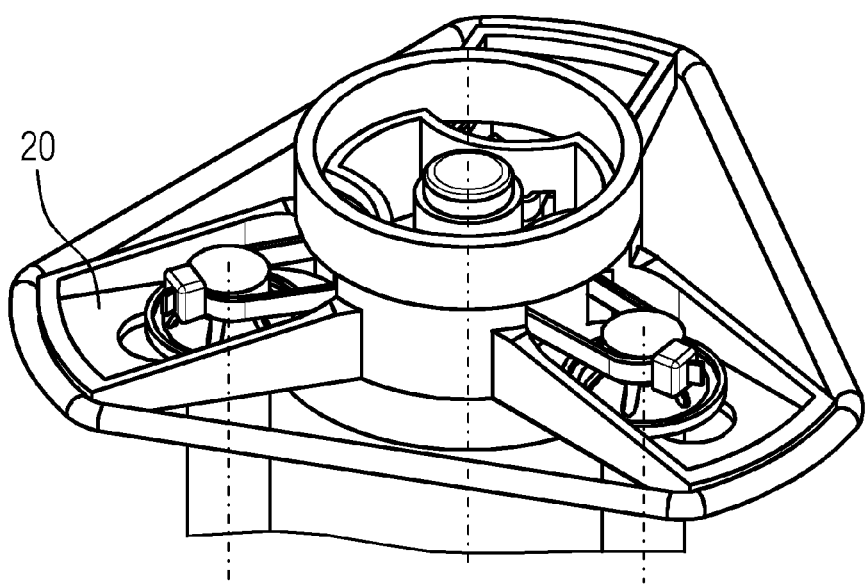
FIG. 7 shows the upper holder according to FIG. 2 in detail without conical springs and spring cups.

FIG. 7 shows the upper holder 20 according to FIG. 2 but the conical spring and the spring cup are hidden so that only the pipe for receiving desiccant can now be seen. The design of the upper holder enables the pipe to be ventilated from below, as a result of which a pipe with no additional ventilation openings can be used.

Figure 3:
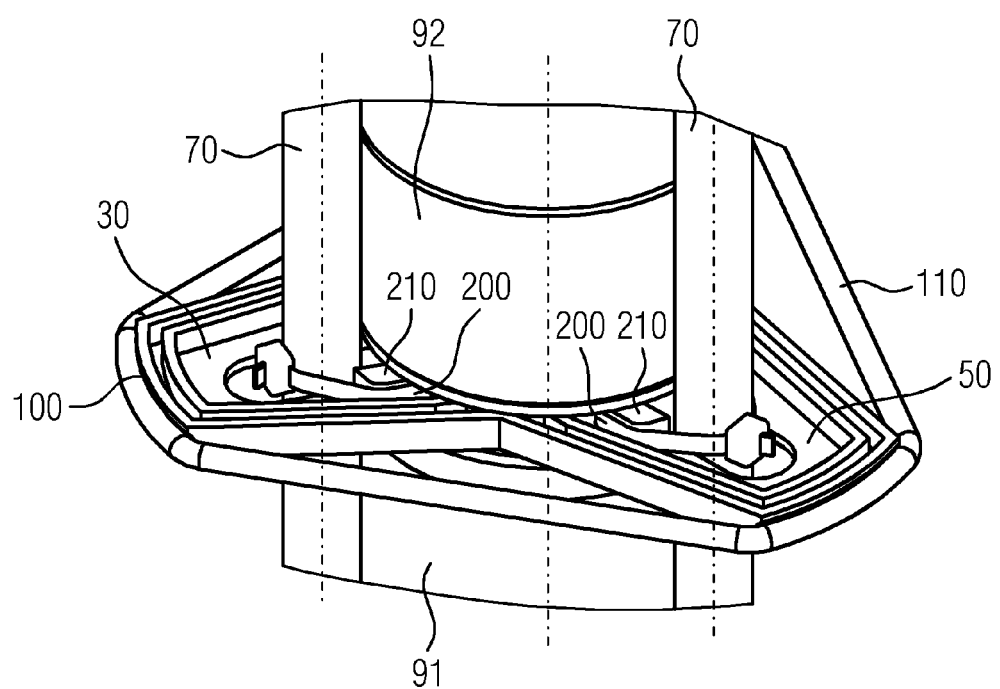
FIG. 3 shows an exemplary embodiment for a non-conductive intermediate holder of the cage of the surge arrester according to FIG. 1 in greater detail.

The detail of the surge arrester 10 designated with the reference symbol Y in FIG. 1 is shown in greater detail in FIG. 3. The intermediate holder 30 and two insulating rods 70 and the ring 110, which, as already explained, mechanically protects the surge arrester, can be seen.

It can furthermore be seen in FIG. 3 that each cable tie 200 is in each case in contact with an associated insulating rod 70 and two supporting sections 210. This situation is also shown in greater detail in FIG. 6 and will be explained further below.

Figure 5:
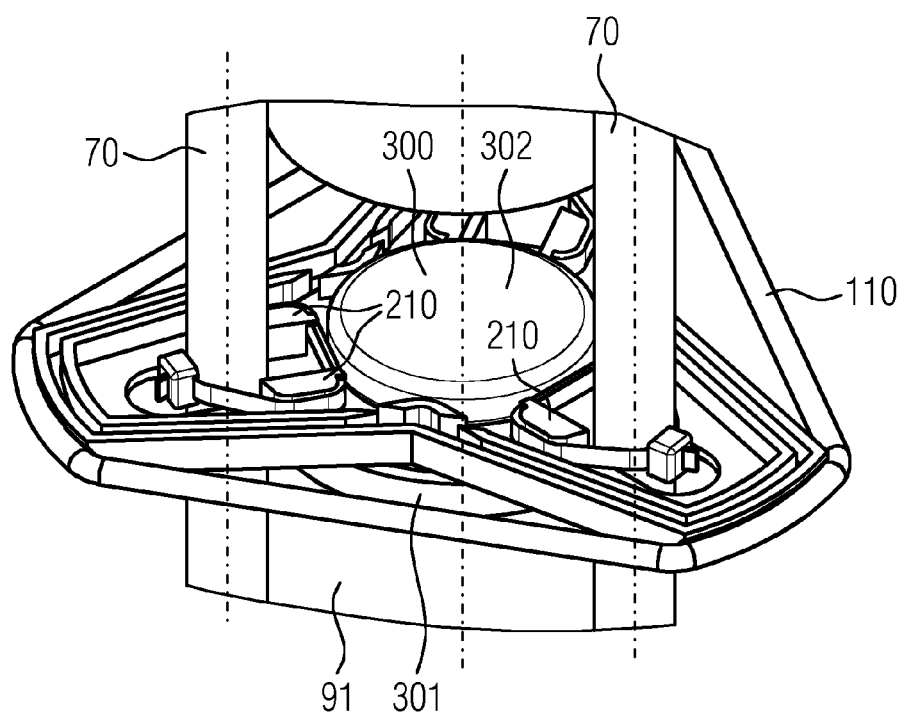
FIG. 5 shows the intermediate holder according to FIG. 3 after a resistor element, situated above the intermediate holder, has been removed.

It can furthermore be seen in FIG. 3 that the intermediate holder 30 physically separates a lower resistor element 91 from a resistor element 92 situated above it. In order to ensure that there is nevertheless an electrical connection between the lower resistor element 91 and the upper resistor element 92, an electrical connecting element can, for example, be arranged between the lower resistor element 91 and the upper resistor element 92, as shown by way of example in FIG. 5. FIG. 5 shows the intermediate holder 30 after the upper resistor element 92 according to FIG. 3 has been removed. It can be observed that an electrical connecting element 300, the lower section 301 of which rests on the lower resistor element 91 and contacts the latter, rests on the lower resistor element 91. The upper section 302 of the electrical connecting element 300 can directly contact the upper resistor element 92 according to FIG. 3 or alternatively cooperate with an electrically conductive intermediate ring.

The mode of operation of the cable ties 200 can furthermore be seen more clearly in FIG. 5. It can be seen that each cable tie is passed around an insulating rod 70 and around two supporting sections 210 in order to draw the respective insulating rod 70 toward the connecting element 300 and thus toward the lower resistor element 91. The insulating rods 70 are thus drawn firmly against the resistor elements 90 by tightening the cable ties 200.

Figure 6:
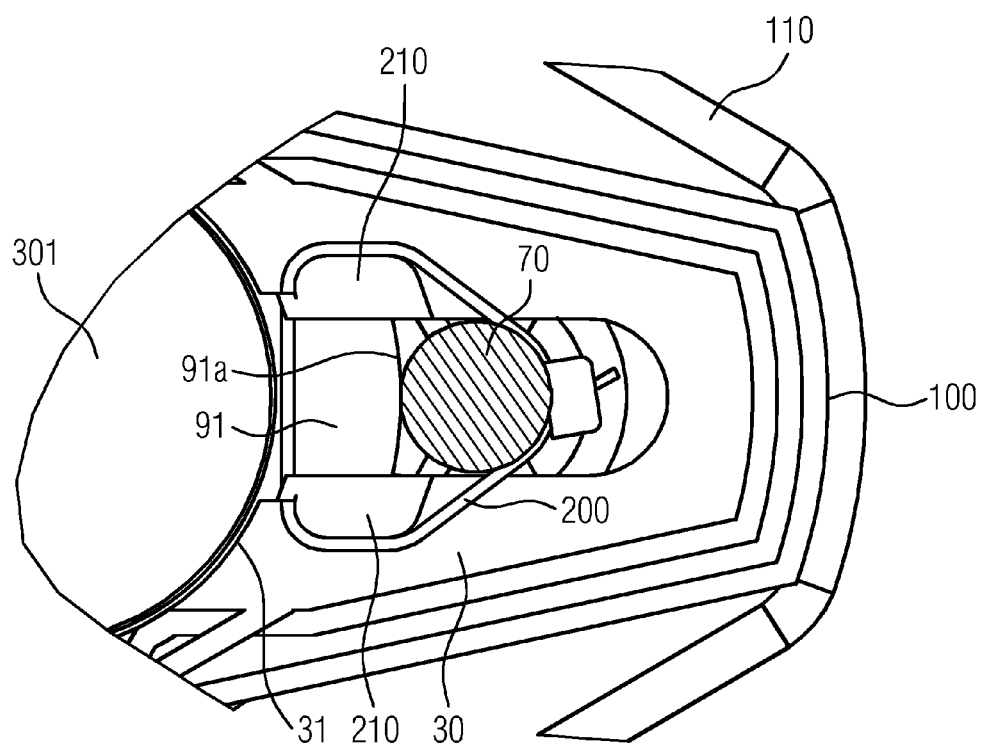
FIG. 6 shows a plan view of the intermediate holder according to FIG. 5 in greater detail.

The mode of operation of the cable ties 200 is shown in greater detail in FIG. 6. FIG. 6 shows the intermediate holder 30 in plain view. The cable tie 200, which is passed around the insulating rod 70 and around the two associated supporting sections 210 and thus presses the insulating rod 70 against the outer contour 91a of the lower resistor element 91, can be seen.

Figure 4:
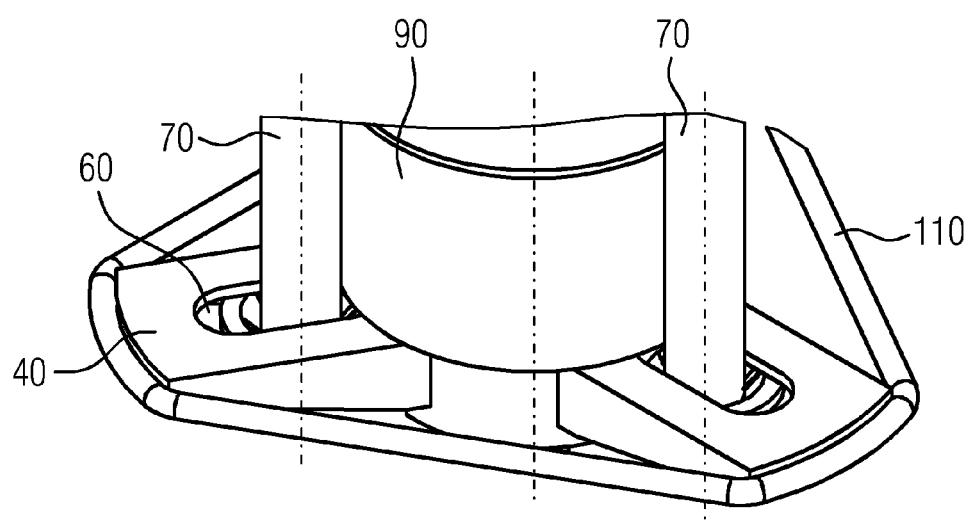
FIG. 4 shows an exemplary embodiment for a lower holder of the cage of the surge arrester according to FIG. 1 in greater detail.

FIG. 4 shows the detail of the surge arrester 10, marked by the reference symbol Z in FIG. 1, in greater detail. The lower holder 40 and the insulating rods 70, which are held in the slots 60 and the position of which is fixed by cable ties, not shown in more detail in FIG. 4, on the underside of the lower holder 40, can be seen. In the case of the lower holder 40 too, the insulating rods 70 are pulled against the resistor elements 90 by cable ties. The mode of operation of the lower holder 40 hence corresponds to the mode of operation of the upper holder 20 and the mode of operation of the intermediate holder 30.

Figure 8:
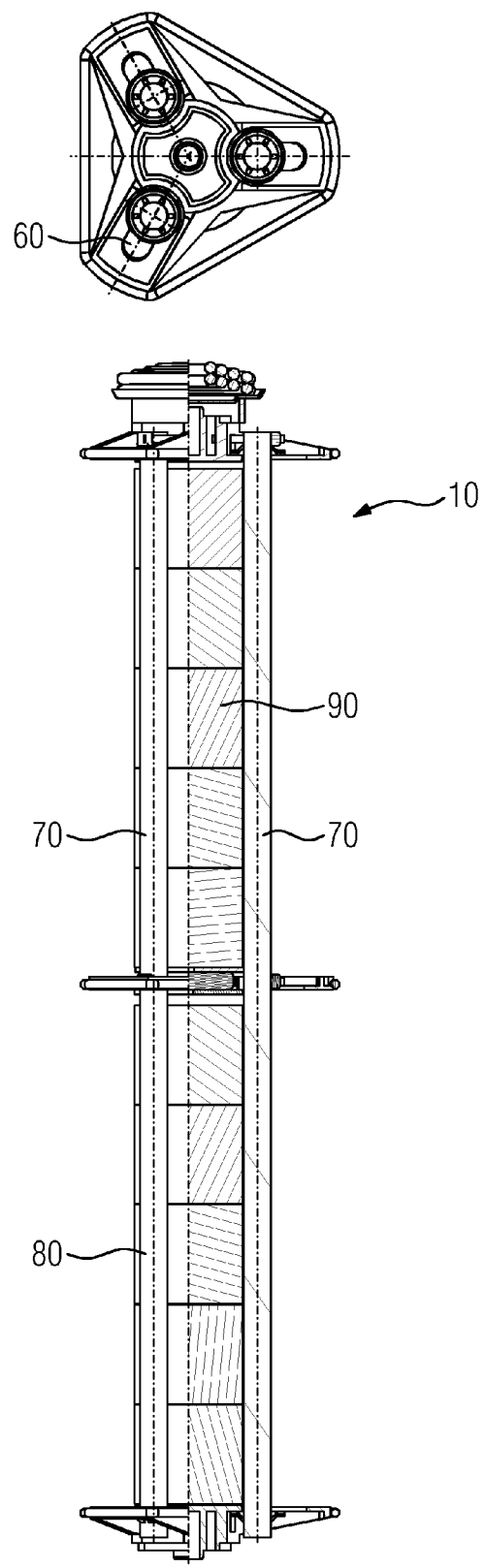
FIG. 8 shows the ready mounted surge arrester according to FIG. 1 with the insulating rods positioned when there are resistor elements of small cross-section.

The surge arrester 10 according to FIG. 1 is shown in FIG. 8, when relatively small resistor elements 90 are used in the cage 80. In order to ensure that the insulating rods 70 rest with no play, the cable ties 200 are tightened such that the insulating rods 70 lie as radially inward as possible in the slots 60. The cage 80 can thus be adjusted by the insulating rods 70 being pushed inward in the slots 60 in such a way that small resistor elements 90 can also be held with no play.

Figure 9:
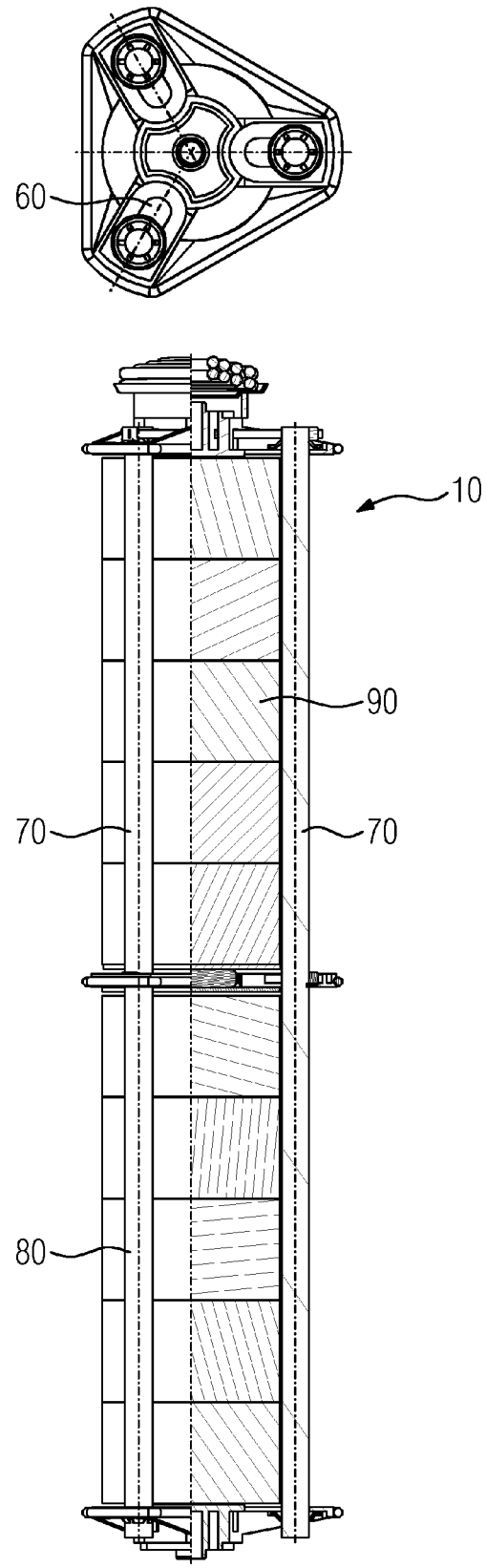
FIG. 9 shows the surge arrester according to FIG. 1 with the insulating rods positioned when there are resistor elements of large cross-section.

FIG. 9 shows the adjustment of the insulating rods 70 with large resistor elements 90. It can be seen that the insulating rods 70 are in each case situated very far radially outward in the slots 60 and hence form a relatively large cage 80. Large resistor elements 90 can thus also be used by arranging the insulating rods 70 to the outside within the slots 60.

Figure 10:
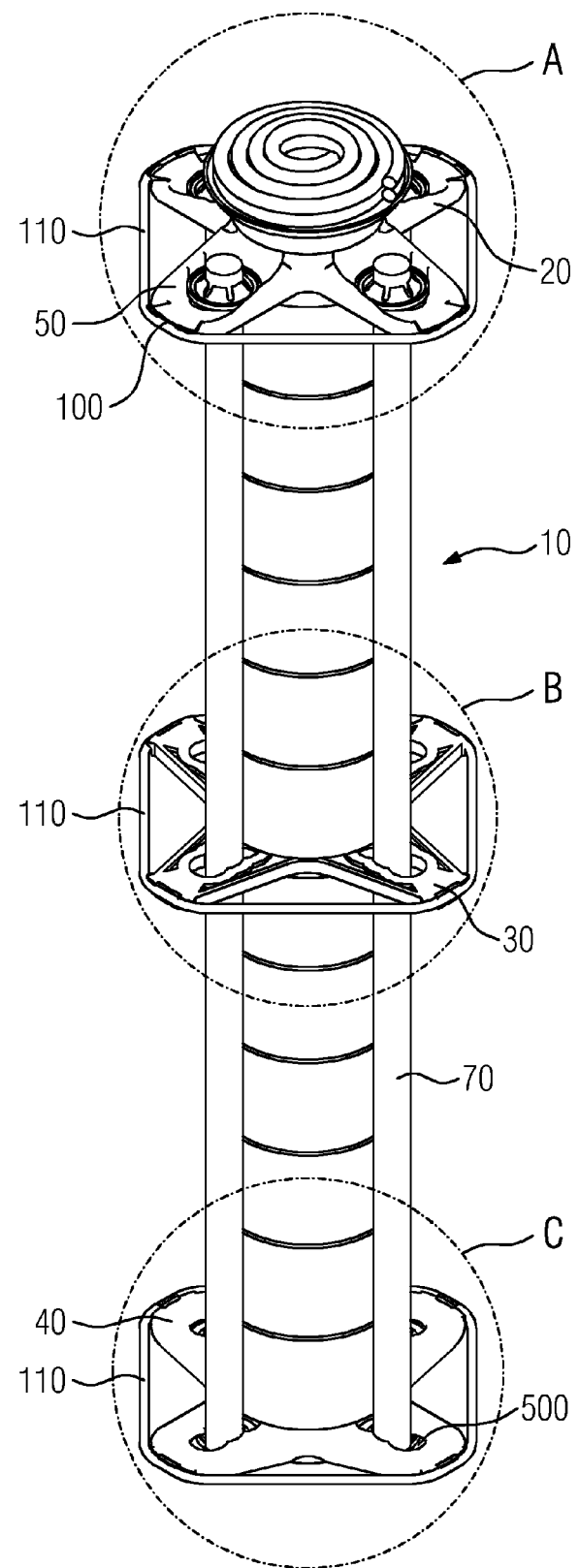
FIG. 10 shows a second exemplary embodiment for a surge arrester with four insulating rods and slots which have tapered parts.

FIG. 10 shows a second exemplary embodiment for a surge arrester 10. This surge arrester also has an upper holder 20, an intermediate holder 30, and a lower holder 40. In contrast to the exemplary embodiment according to FIG. 1, the three holders 20, 30 and 40 are each equipped with four radially outward extending holding sections 50 so that in all four insulating rods 70 can be held instead of three insulating rods.

It can furthermore be seen in FIG. 10 that the three holders 20, 30 and 40 are each provided with fastening grooves 100 which enable an elastic ring 110 with a mechanical damping effect to be mounted on the holders in order to enable the surge arrester 10 to be stored horizontally and transported horizontally.

Figure 14:
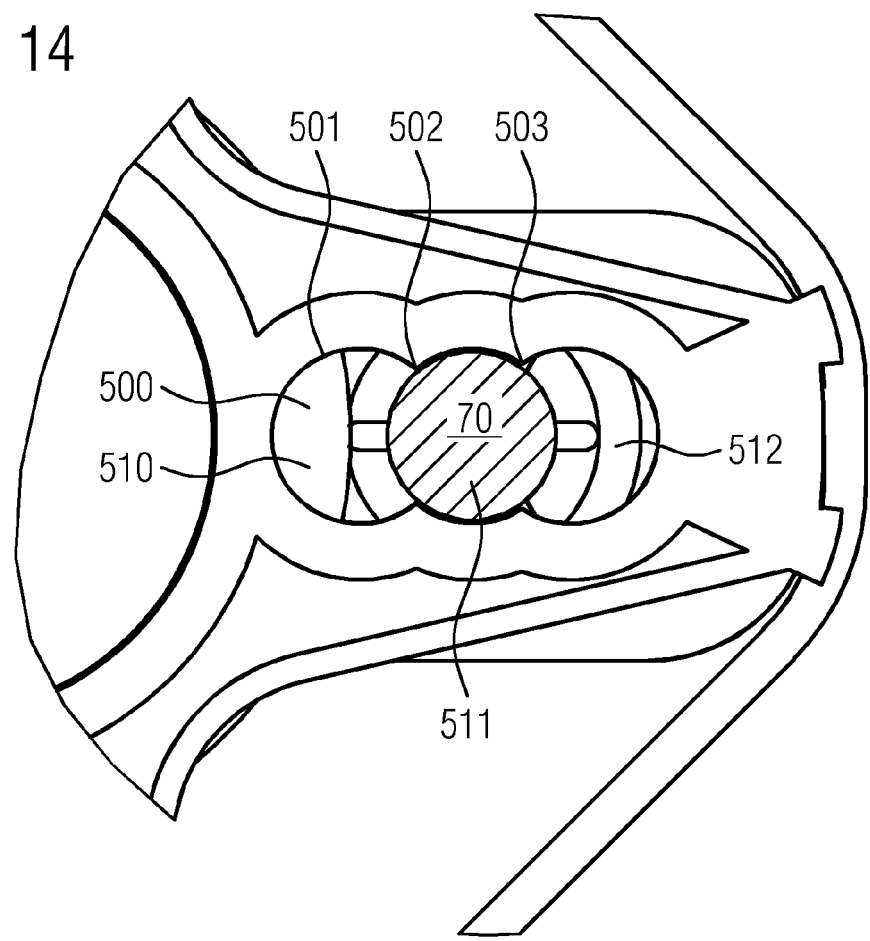
FIG. 14 shows the design of the slots with tapered parts for the surge arrester according to FIG. 10 in greater detail.

Slots 500, the inner contour 501 (cf FIG. 14) of which is in each case provided with two tapered parts 502 and 503, are in each case provided in each holding section 50 of the three holders 20, 30 and 40. The slot, as shown in FIG. 14, is divided into three adjacent slot sections 510, 511 and 512 by the two tapered parts 502 and 503. The size of each of the three slot sections 510, 511 and 512 is in each case selected such that an insulating rod 70 can be passed through the respective slot section and held by the latter. The two tapered parts 502 and 503 are here moreover dimensioned in such a way that the insulating rod 70 is mechanically held in the respective slot section 510, 511 and 512 and the insulating rod 70 is prevented from being displaced radially from one slot section into another slot section. The respective position of the insulating rods 70 in the slot 500 is therefore fixed by the respective insulating rod 70 being introduced into the desired slot section during mounting, either the radially inward situated slot section 510, the middle slot section 511, or the radially outward situated slot section 512.

Figure 11:
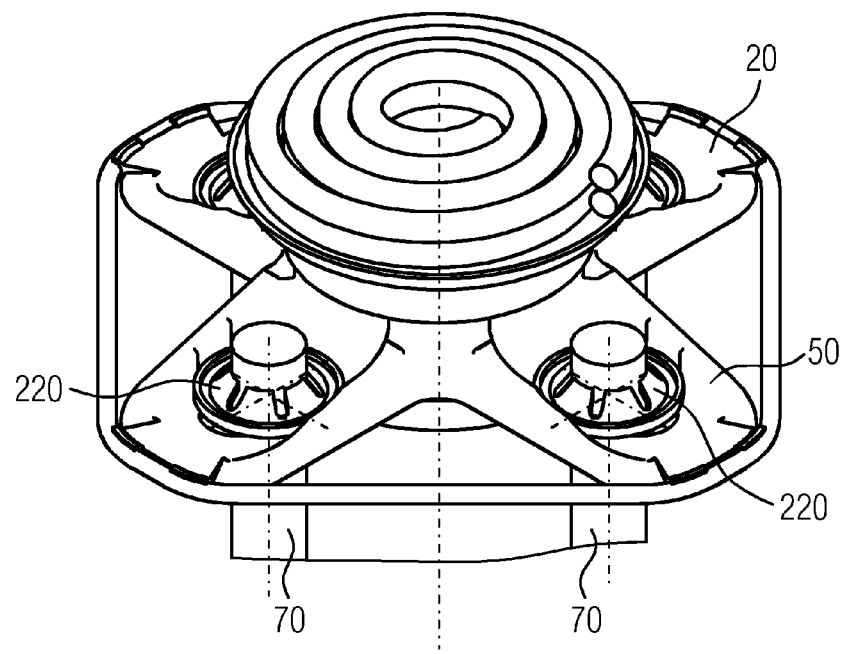
FIG. 11 shows an upper holder of the cage of the surge arrester according to FIG. 10.

FIG. 11 shows the detail designated by the reference symbol A in FIG. 10 in greater detail. Visible are the upper holder 20 with the four radially outward extending holding sections 50, and two insulating rods 70 which are held by clamping elements 220 longitudinally (in other words, in the longitudinal direction of the surge arrester 10 or the longitudinal direction of the insulating rods 70). The position of the insulating rods 70 in the radial direction is fixed by the choice of the respective slot section 510, 511 or 512 according to FIG. 14.

Figure 12:
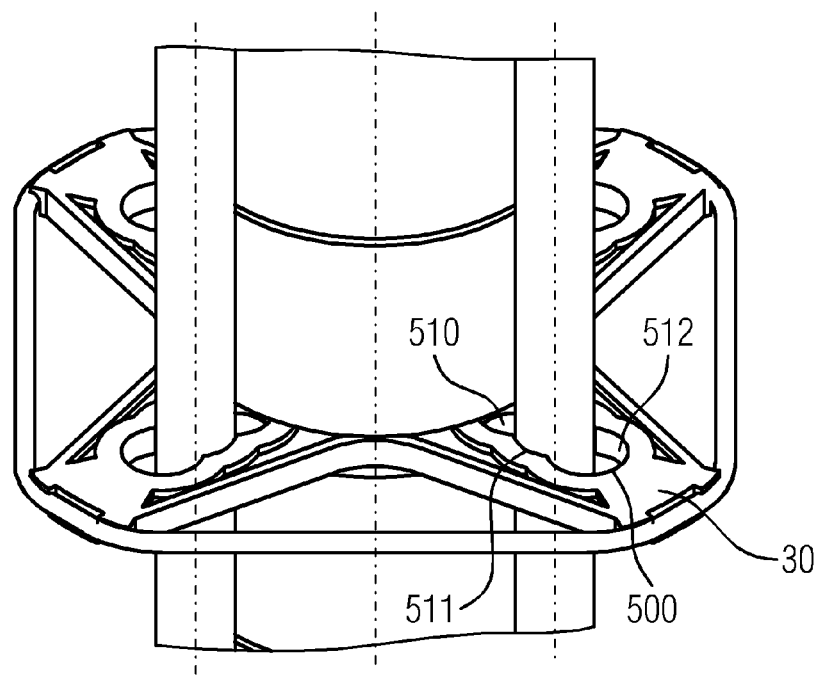
FIG. 12 shows a non-conductive intermediate holder of the surge arrester according to FIG. 10.

FIG. 12 shows the detail marked by the reference symbol B in FIG. 10. Visible are the intermediate holder 30 with the four radially outward extending holding sections 50, and the slots 500 which, by virtue of the tapered parts, in each case form three radially outward extending slot sections 510, 511 and 512, as has already been explained in connection with FIG. 14.

Figure 13:
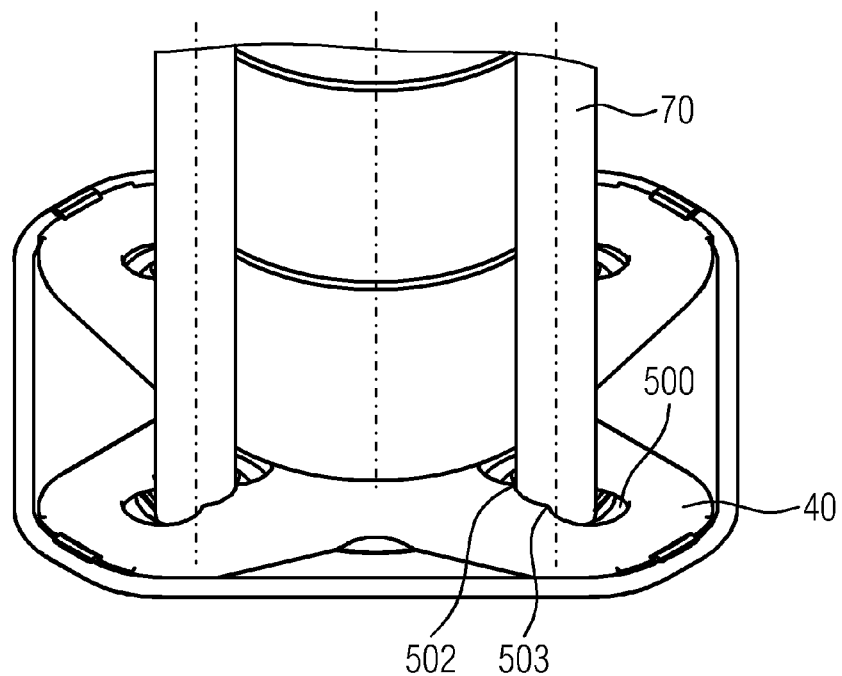
FIG. 13 shows a lower holder of the cage of the surge arrester according to FIG. 10.

FIG. 13 shows the detail designated by the reference symbol C in FIG. 10 in greater detail. Visible are the lower holder 40 and the slots 500 with the tapered parts 502 and 503 by means of which the three slot sections for the insulating rods are formed.

The surge arrester 10 according to FIG. 10 is shown in FIG. 15 with relatively small resistor elements 90, in terms of cross-section, inserted into the cage 80. It can be seen that in such a case the insulating rods 70 are inserted into the inner situated slot sections 510 (cf FIG. 14) in order to create a cage 80 that is as small as possible and in which the resistor elements 90 can be held with as little play as possible.

Figure 16:
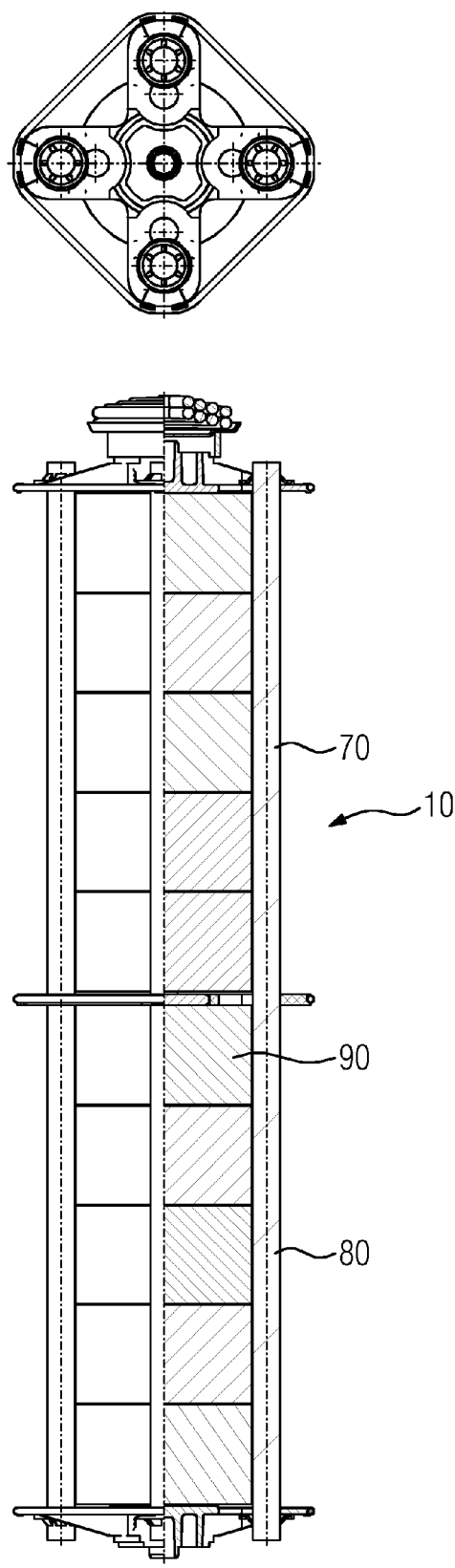
FIG. 16 shows the surge arrester according to FIG. 10 with the insulating rods positioned in the case of resistor elements of large cross-section.

FIG. 16 shows the surge arrester 10 according to FIG. 10, with relatively large resistor elements 90, in terms of cross-section, inserted. In this case, the insulating rods 70 are preferably inserted into the radially outward situated slot sections 512 (cf FIG. 14) in order to obtain the largest possible cross-section of the cage 80.

In summary, an appropriate cage size for the cage 80 can be set by selecting an appropriate slot section 510, 511 or 512 (cf FIG. 14) so that the cage 80 can receive the resistor elements 90 which are to be mounted.

Figure 17:
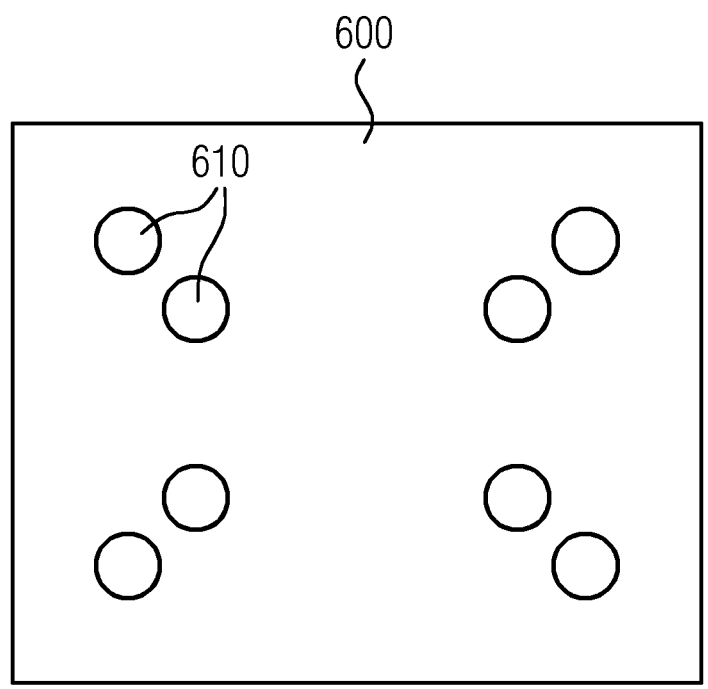
FIG. 17 shows a third exemplary embodiment for a holder for variably fastening an insulating rod.

FIG. 17 shows, by way of example, a third exemplary embodiment for a holder 600 which can form an upper holder, an intermediate holder, or a lower holder for variable fastening of an insulating rod. The holder 600 has, for each insulating rod, in each case at least two fastening slots 610, arranged apart from each other, which are in each case suitable for a rod end of the variably positionable insulating rod to be passed through and held there.

Although the invention was illustrated and described in greater detail by the preferred exemplary embodiments, the invention is not limited by the disclosed examples and other alternatives can be derived by a person skilled in the art without going beyond the scope of the invention.

The invention claimed is:

1. A surge arrester, comprising:
   a cage including an upper holder, a lower holder and at least three insulating rods having rod ends;
   one of said rod ends of each of said insulating rods being held by said upper holder and the other of said rod ends of each of said insulating rods being held by said lower holder;
   said upper holder and said lower holder each configured to allow at least two different positions for at least one of said insulating rods relative to said holders;
   said holders each configured to allow positioning of said at least one insulating rod differently relative to said holders;
   at least one resistor element disposed in said cage;
   said upper holder and said lower holder each having a respective slot formed therein through which a respective one of said rod ends of said variably positioned insulating rod passes to fasten said at least one variably positioned insulating rod; and
   a tightening strap configured to be adjusted during mounting, to be passed around said variably positioned insulating rod and to exert a tensile force on said variably positioned insulating rod in direction of said at least one resistor element.

2. The surge arrester according to claim 1, wherein:
   said upper holder and said lower holder each have a respective support section configured to fasten said at least one variably positioned insulating rod; and
   said adjustable tightening strap is passed around said support section and said variably positioned insulating rod and exerts a tensile force on said variably positioned insulating rod, in direction of said at least one resistor element, by being supported on said support section.

3. The surge arrester according to claim 1, wherein said slot has a longitudinal direction extending radially outward from a center of said cage.

4. The surge arrester according to claim 1, wherein said adjustable tightening strap is formed by a cable tie.

5. The surge arrester according to claim 1, wherein:
said slots each have at least one tapered part dividing said slot into adjacent slot sections;
each of said slot sections has a size allowing said variably positioned insulating rod to be passed through said respective slot section; and
said at least one tapered part has a dimension configured to hold said variably positioned insulating rod in said respective slot section and to prevent said variably positioned insulating rod from being displaced from said respective slot section to an adjacent slot section.

6. The surge arrester according to claim 1, wherein said upper holder and said lower holder each have at least two fastening holes formed therein, spaced apart from each other and configured to allow one of said rod ends of said variably positioned insulating rod to pass therethrough, for fastening said at least one variably positioned insulating rod.

7. A surge arrester, comprising:
a cage including an upper holder, a lower holder and at least three insulating rods having rod ends;
one of said rod ends of each of said insulating rods being held by said upper holder and the other of said rod ends of each of said insulating rods being held by said lower holder;
said upper holder and said lower holder each configured to allow at least two different positions for at least one of said insulating rods relative to said holders;
said holders each configured to allow positioning of said at least one insulating rod differently relative to said holders;
at least one resistor element disposed in said cage;
at least one intermediate holder disposed between said upper holder and said lower holder;
said at least one intermediate holder having a slot formed therein with a longitudinal direction extending radially outward from a center of said cage, said slot configured to allow said variably positioned insulating rod to pass therethrough, for fastening said at least one variably positioned insulating rod; and
an adjustable tightening strap passed around said variably positioned insulating rod and configured to exert a tensile force on said variably positioned insulating rod, in direction of said center of said cage.

8. The surge arrester according to claim 7, wherein said adjacent slot sections include at least two adjacent slot sections.

9. A surge arrester, comprising:
a cage including an upper holder, a lower holder and at least three insulating rods having rod ends;
one of said rod ends of each of said insulating rods being held by said upper holder and the other of said rod ends of each of said insulating rods being held by said lower holder;
said upper holder and said lower holder each configured to allow at least two different positions for at least one of said insulating rods relative to said holders;
said holders each configured to allow positioning of said at least one insulating rod differently relative to said holders; and
at least one resistor element disposed in said cage;
at least said upper holder and said lower holder each having an outer contour with a holding device and a ring having a mechanical damping effect applied in said holding device.

10. The surge arrester according to claim 9, wherein said holding device is a fastening groove.

11. The surge arrester according to claim 9, wherein said ring is elastic.

* * * * *